Feb. 16, 1943.     T. BACKUS     2,311,201
TRANSMISSION REVERSE GEARING
Filed Sept. 17, 1942     2 Sheets-Sheet 1

INVENTOR.
Thomas Backus
BY
Earl + Chappell

Feb. 16, 1943.  T. BACKUS  2,311,201
TRANSMISSION REVERSE GEARING
Filed Sept. 17, 1942  2 Sheets-Sheet 2

INVENTOR.
Thomas Backus
BY
Carl + Chappell

Patented Feb. 16, 1943

2,311,201

UNITED STATES PATENT OFFICE 2,311,201

TRANSMISSION REVERSE GEARING

Thomas Backus, Kalamazoo, Mich., assignor to Fuller Manufacturing Company, Kalamazoo, Mich.

Application September 17, 1942, Serial No. 458,668

2 Claims. (Cl. 74—333)

This invention relates to improvements in transmission reverse gearing.

This invention relates to change speed transmissions and particularly to the arrangement of the gearing for reversing. It has for its objects:

First, to provide a new and improved change speed transmission.

Second, to provide such a transmission with an arrangement of gearing for reversing the transmission which can be shifted into and out of operation by a very short movement of the gear shifting lever in the cab of a vehicle in which the transmission is employed.

Third, to provide such a transmission which is simple and inexpensive to manufacture.

Other objects and advantages pertaining to details and economies of construction and operation will appear from the description to follow. Preferred embodiments of my invention are illustrated in the accompanying drawings, in which.

Figure 1:
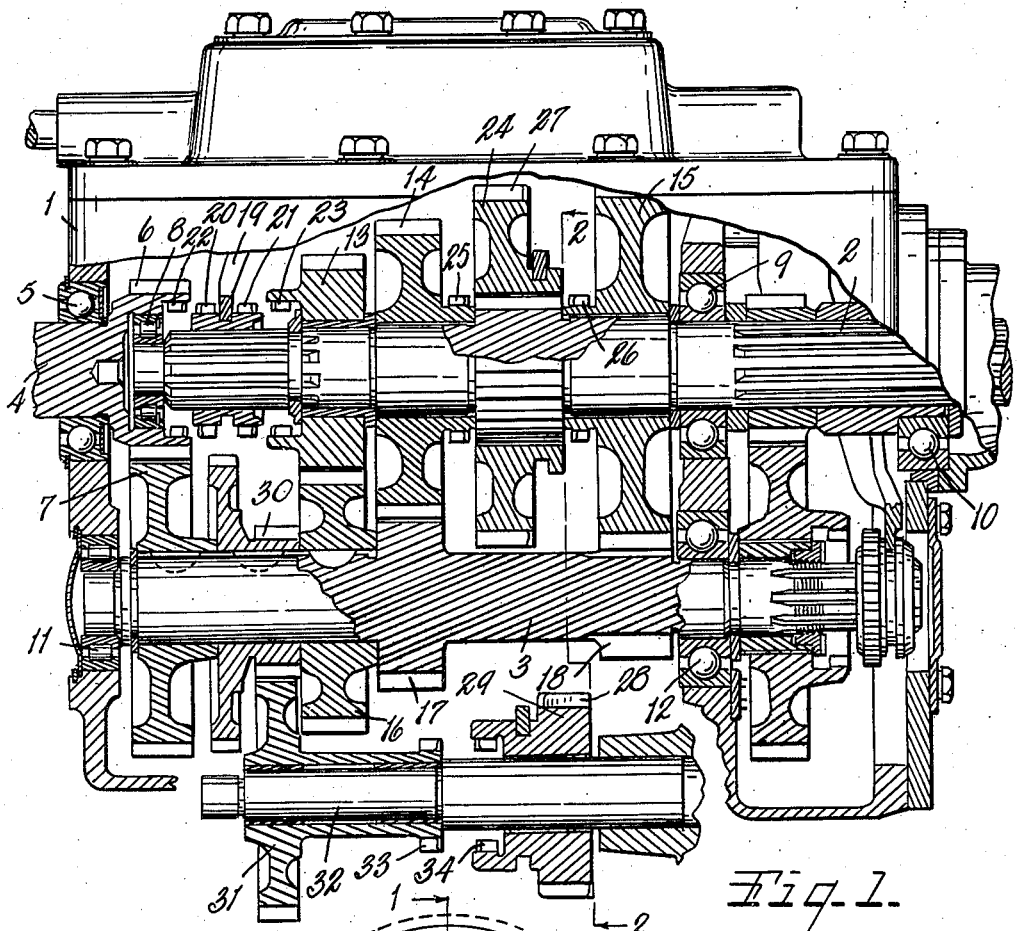
Fig. 1 is a detail sectional view of a transmission embodying my invention taken on the line 1—1 of Fig. 2.
Figure 2:
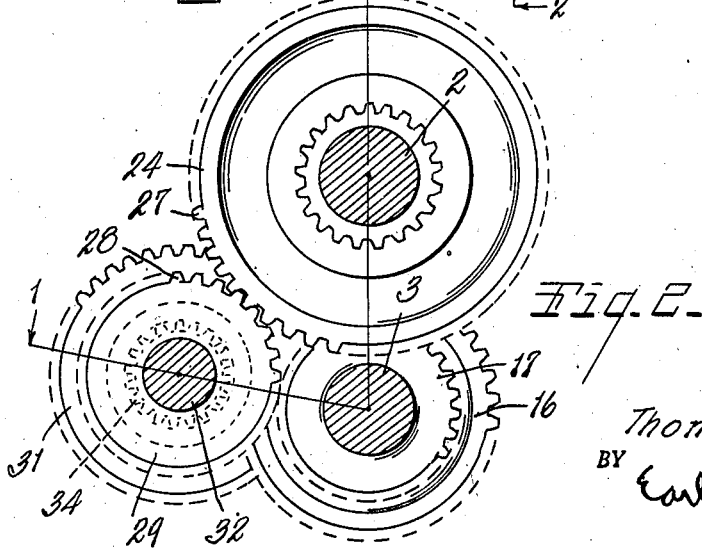
Fig. 2 is an end view of the various shafts and gearing employed in the transmission.

In Figs. 1 and 2, I show a five-speed constant mesh transmission embodying one form of the invention. The transmission comprises a casing 1, a main shaft 2, a countershaft 3 and an input shaft 4. The input shaft 4 which is mounted in a suitable bearing 5 has an integral gear 6 which meshes with a gear 7 non-rotatably mounted on the countershaft. The main shaft is supported by pilot bearing 8 in the gear 6 and bearings 9 and 10. The countershaft is supported by bearings 11 and 12. On the main shaft are gears 13, 14 and 15 which are helical gears in constant mesh respectively with gears 16, 17 and 18 which are fixed on the countershaft. The gears 13, 14 and 15 are bushed on the main shafting. I provide a clutch member 19 splined on the main shaft and having two sets of clutch teeth 20 and 21 adapted to selectively engage clutch teeth 22 on the gear 6 or clutch teeth 23 on the gear 13.

Splined to the main shaft is a shiftable member 24 which comprises an axially shiftable clutch member adapted to selectively engage either the clutch teeth 25 on gear 14 or the clutch teeth 26 on the gear 15. The member 24 likewise serves as a reverse gear since it has a plurality of peripherally arranged spur gear teeth 27 which are adapted to mesh with the spur gear teeth 28 on reverse idler gear 29.

On the countershaft, I provide also a fixed gear 30 which is in mesh with a reverse idler gear 31. The reverse idler gears 29 and 31 are both bushed on an enlarged and a reduced portion, respectively of a fixed reverse idler shaft 32, said enlarged and reduced portions providing a shoulder therebetween to confine the gear 31 against axial movement in one direction on the shaft 32. The gear 31 is rotatable and driven by the gear 30. It is a stem gear having clutch teeth 33 thereon which are adapted to mesh with clutch teeth 34 on the gear 29. The gear 29 is shiftable axially to engage clutch teeth 33 and 34 or to disengage them. When the clutch teeth 33 and 34 are in engagement, the teeth 28 of the gear 29 mesh with the teeth 27 of the member 24 which in neutral position, as illustrated in Fig. 1, serves as a reverse gear. The clutch teeth 33 and 34 are of such axial length and are so positioned that an axial movement of the teeth 28 a distance equal to the width of the teeth 27 on the member 24 to disengage the gear 29 from the member 24 which serves as a reverse gear will disengage teeth 33 and 34.

In Fig. 1, the transmission is shown with the reverse gearing disengaged. The reverse gearing is engaged when the member 24 is in the position shown in Fig. 1 and when the gear 29 is shifted to the left as viewed in Fig. 1 to pick up the teeth 27 and to engage the clutch teeth 33 and 34. The drive is then from the input shaft 4 through the gear 6 to the gear 7 and from the gear 30 to the gear 31, thence through clutch teeth 33 and 34 to the gear 29 and thence to the member 24 which serves as a main shaft reverse gear. The engagement and disengagement of the clutch teeth 33 and 34 is accomplished by a movement of the gear 29 within a distance substantially equal to the width of the teeth 27 and this makes it possible to engage or disengage the reverse gearing by a very short movement of the gear shifting lever, which is common to vehicles employing change speed transmissions. The structure is thus extremely practical and useful since cab space in a truck is at a premium.

Figure 3:
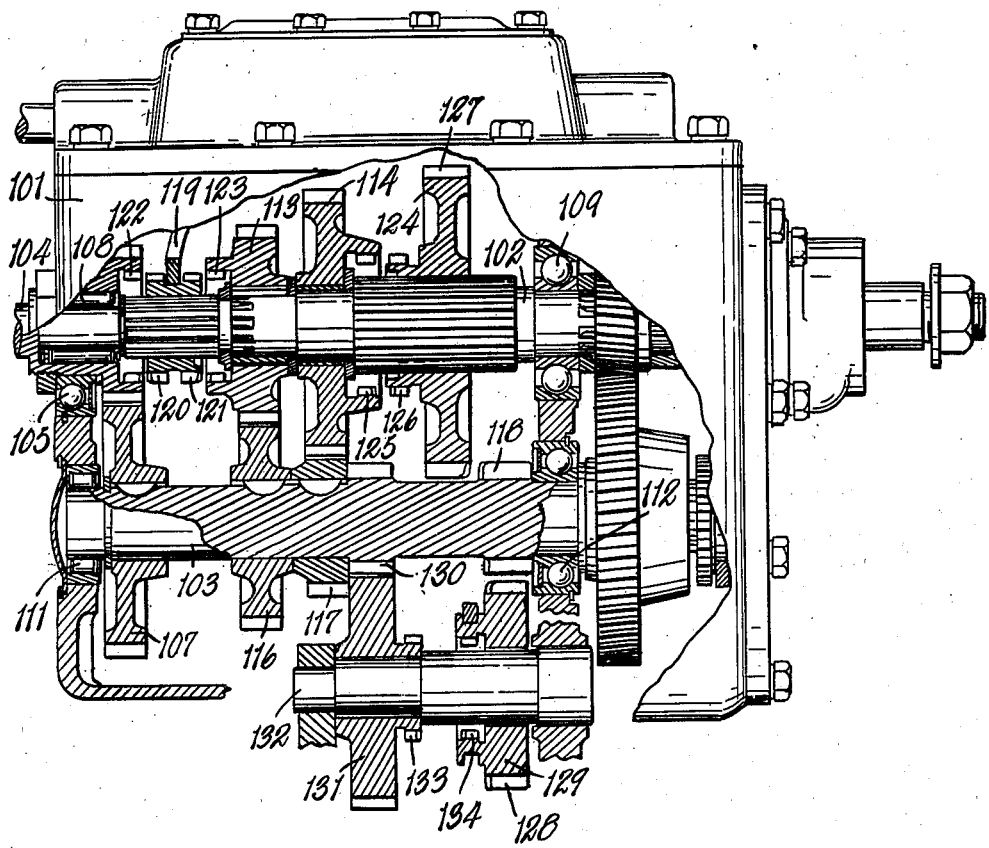
Fig. 3 is a view corresponding to Fig. 1 of a different form of the invention.

In Fig. 3, I show a different form of the invention. There is a casing 101, a main shaft 102, a countershaft 103 and an input shaft 104. There are suitable bearings 105, 108, 109, 111, 112. There is a gear 107 fixed to the countershaft 103 and there are gears 113 and 114 in mesh respectively with gears 116 and 117 fixed to the countershaft. There is a clutch member 119 having clutch teeth 120 and 121 adapted to mesh selectively with clutch teeth 122 on the gear 106 and clutch teeth 123 on the gear 113.

There is a reverse gear 124 having spur teeth 127. This gear is splined on the main shaft and is provided with clutch teeth 126 adapted to mesh with clutch teeth 125 on the gear 114. The gear 124 serves both as a reverse gear and as a low gear. It is shiftable to the right from the position shown in Fig. 3 to pick up the countershaft gear 118. When it is in the neutral position, shown in Fig. 3, it serves as a main shaft reverse gear.

Mounted in the transmission is a fixed reverse idler shaft 132. It has bushed thereon a gear 131 which is driven by a reverse countershaft gear 130. Slidably and rotatably bushed on the countershaft 132 is a second reverse idler gear 129 having spur teeth 128. The gear 131 is provided with clutch teeth 133 and the gear 129 is provided with corresponding clutch teeth 134. The gear 129 may be slid to the left as viewed in Fig. 3 to pick up the gear 124 when it is in the position shown in Fig. 3 and to simultaneously engage clutch teeth 133 and 134. When this is done, the reverse gearing is in operative position and the drive is from shaft 104 through gear 106 to gear 107 and from gear 130 to gear 131 thence through clutch teeth 133 and 134 to gear 129 and thence to gear 124.

The clutch teeth 133 and 134 are of such length that a shifting of the gear 129 to the right from engaged position a distance equal to the width of the gear 124 to disengage gears 129 and 124 will likewise disengage clutch teeth 133 and 134.

This arrangement using a spur gear low has the same advantages as the structure shown in Figs. 1 and 2. The shift to engage or disengage the low gear is a short one and this permits a short shift lever movement to accomplish the results.

This construction of the reverse gearing can be made very inexpensively. The mounting of the fixed reverse idler shaft is simple and the bushing of the gears thereon is not involved. The gears and clutch teeth can be made very easily and inexpensively on ordinary gear cutting equipment.

The terms and expressions which have been herein employed are used as terms of description and not of limitation, and there is no intention, in the use of such terms and expressions, of excluding any equivalents of the features shown and described, or portions thereof, but it is recognized that various modifications are possible within the scope of the invention claimed.

Having thus described my invention, what I claim as new and desire to secure by Letters Patent is:

1. In a change speed transmission having a main shaft and a countershaft with cooperating gears thereon and a non-rotatable reverse idler shaft having enlarged and reduced portions, a first rotatable reverse idler gear on a reduced portion of said idler shaft, a gear on said countershaft in mesh with said first reverse idler gear to drive the same, a second reverse idler gear on an enlarged portion of said idler shaft and shiftable axially and rotatable relative to said first reverse idler gear, said enlarged and reduced portions providing a shoulder to confine said first idler gear against axial movement on said idler shaft, cooperating clutch teeth on said first and second reverse idler gears, and a main shaft gear on said main shaft and adapted to mesh with said second reverse idler gear when said clutch teeth are engaged, said clutch teeth being disengageable by shifting said second reverse idler within a distance equal substantially to the width of said main shaft gear.

2. In a change speed transmission having a main shaft and a countershaft with cooperating gears thereon, a fixed reverse idler shaft, a first reverse idler gear bushed for rotation on said idler shaft, a gear on said countershaft in mesh with said first reverse idler gear to drive the same, a second reverse idler gear bushed for rotation on said idler shaft and shiftable axially thereon, said second idler gear being rotatably supported on said fixed idler shaft independently of said first idler gear, cooperating clutch teeth on said first and second reverse idler gears, and a main shaft gear on said main shaft and adapted to mesh with said second reverse idler gear when said clutch teeth are engaged, said clutch teeth being disengageable by shifting said second reverse idler within a distance equal substantially to the width of said main shaft gear.

THOMAS BACKUS.